United States Patent
Yuan et al.

(10) Patent No.: US 8,089,040 B2
(45) Date of Patent: Jan. 3, 2012

(54) ENCODER ASSEMBLY

(75) Inventors: Shao-Chung Yuan, Taipei Hsien (TW); Yin-Jao Luo, Taipei Hsien (TW); Yi-Cheng Su, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 458 days.

(21) Appl. No.: 12/482,386

(22) Filed: Jun. 10, 2009

(65) Prior Publication Data

US 2010/0213798 A1    Aug. 26, 2010

(30) Foreign Application Priority Data

Feb. 24, 2009    (CN) .................. 2009 1 0300530

(51) Int. Cl.
*H02K 11/00* (2006.01)
*H02K 5/124* (2006.01)

(52) U.S. Cl. .................................. 250/231.13; 250/239

(58) Field of Classification Search ............. 250/231.13–231.18, 239
See application file for complete search history.

(56) References Cited

U.S. PATENT DOCUMENTS

| | | | |
|---|---|---|---|
| 7,667,189 B2 * | 2/2010 | Ramachandran et al. | 250/231.13 |
| 7,718,951 B2 * | 5/2010 | Scharrer et al. | 250/231.13 |
| 7,838,815 B2 * | 11/2010 | Yamagata | 250/231.13 |
| 7,939,796 B2 * | 5/2011 | Satone et al. | 250/231.13 |

* cited by examiner

*Primary Examiner* — Seung C Sohn
(74) *Attorney, Agent, or Firm* — Altis Law Group, Inc.

(57) ABSTRACT

An encoder assembly includes an encoder, a fixing cover for receiving the encoder, and a protecting cover for receiving the fixing cover. The encoder includes a main body, and a trumpet-shaped rubber collar extending from a first end of the main body. The fixing cover includes a first open end and a second open end opposite to the first open end. The second open end engages with an outer side of the rubber collar. The protecting cover includes an open end and a closed end opposite to the open end. A circular protrusion extends from an inner wall of the closed end to engage with an inner side of the rubber collar.

14 Claims, 3 Drawing Sheets

ENCODER ASSEMBLY

BACKGROUND

1. Technical Field

The present disclosure relates to encoders, and particularly, to an encoder assembly for a motor.

2. Description of Related Art

Generally, an encoder for a motor is installed in a protecting cover. The encoder is fixed to a shaft of the motor, and the protecting cover is fixed to a rear cover of the motor. However, when the shaft of the motor rotates, the encoder may not rotate smoothly with the shaft and eccentrically vibrate, especially if the shafts of the motor and the encoder are not precisely coaxial. In such an instance, the encoder may be seriously damaged.

DETAILED DESCRIPTION

Figure 1:
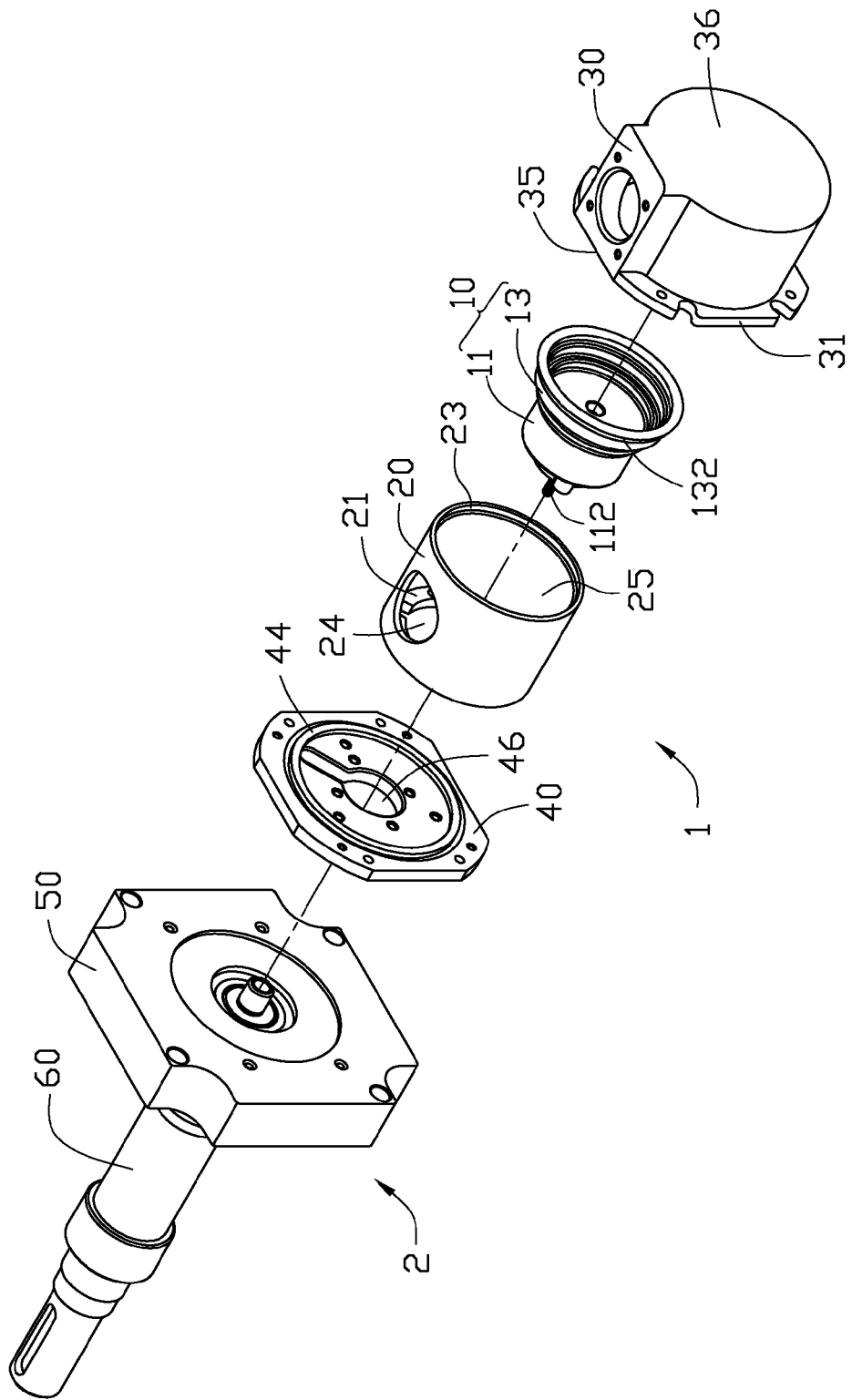
FIG. 1 is an exploded, isometric view of an embodiment of an encoder assembly, together with a shaft and a rear cover of a motor.

Referring to FIG. 1, an embodiment of an encoder assembly 1 includes an encoder 10, a cylinder-shaped fixing cover 20 for receiving the encoder 10, a cylinder-shaped protecting cover 30 for receiving the fixing cover 20, and a heat insulating plate 40.

The encoder 10 includes a column-shaped main body 11. A shaft 112 extends from a first end of the main body 11, and a trumpet-shaped rubber collar 13 extends from a second end opposite to the first end of the main body 11. A flange 132 protrudes outwardly from the rubber collar 13, opposite to the main body 11.

The fixing cover 20 includes a first open end 24, and a second open end 25 opposite to the first open end 24. A circular fixing portion 21 extends from a wall bounding the first open end 24 towards a center of the first open end 24, and a circular recess 23 is defined in an inner wall bounding the second open end 25.

The protecting cover 30 includes an open end 35, and a closed end 36 opposite to the open end 35. A fixing plate 31 extends outwardly from a circumference of the protecting cover 30, at the open end 35, and a circular protrusion 33 extends from an inner wall bounding the closed end 36 towards the open end 35 (see FIG. 3).

A through hole 46 is defined in a center of the heat insulating plate 40. A circular projection 44 extends from a side of the heat insulating plate 40.

Figure 2:
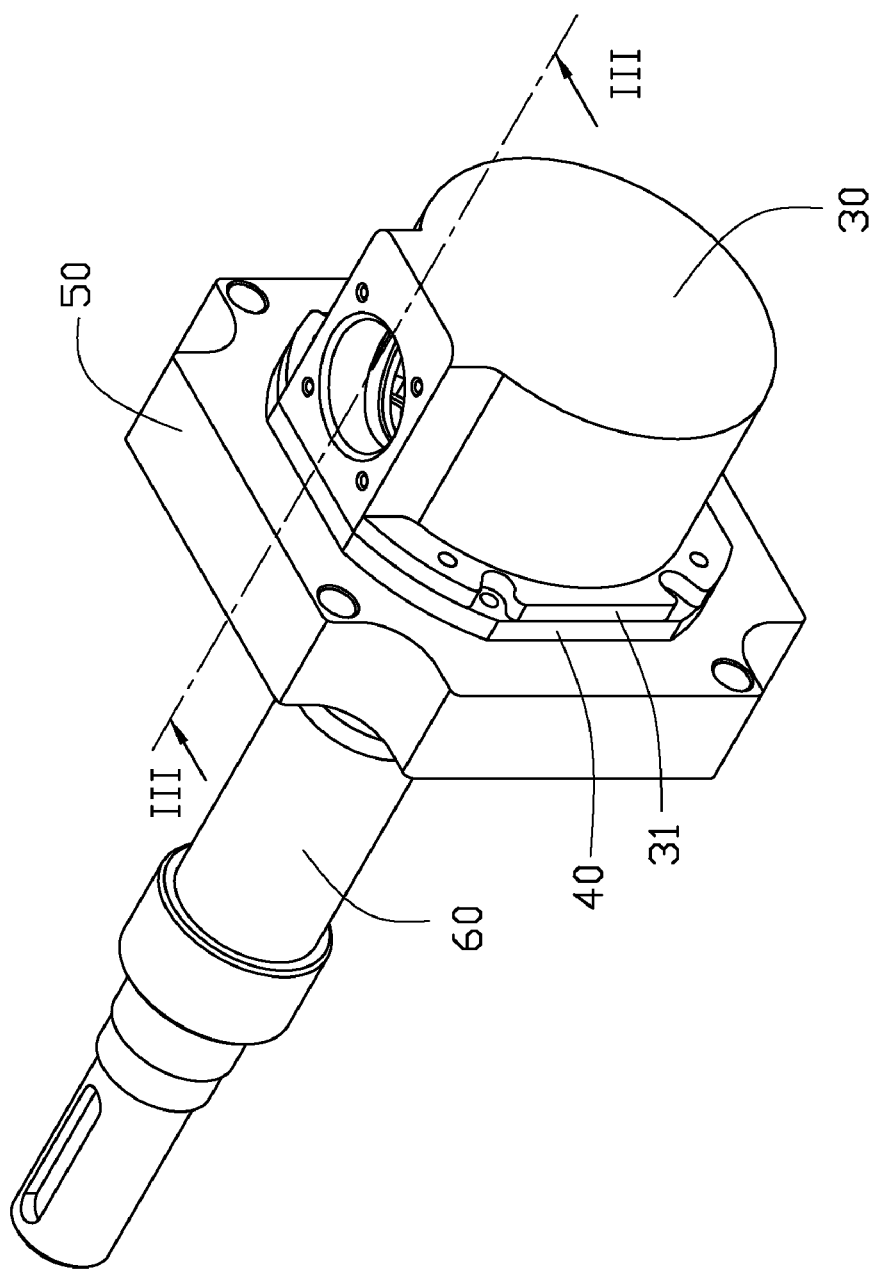
FIG. 2 is an assembled, isometric view of FIG. 1.
Figure 3:
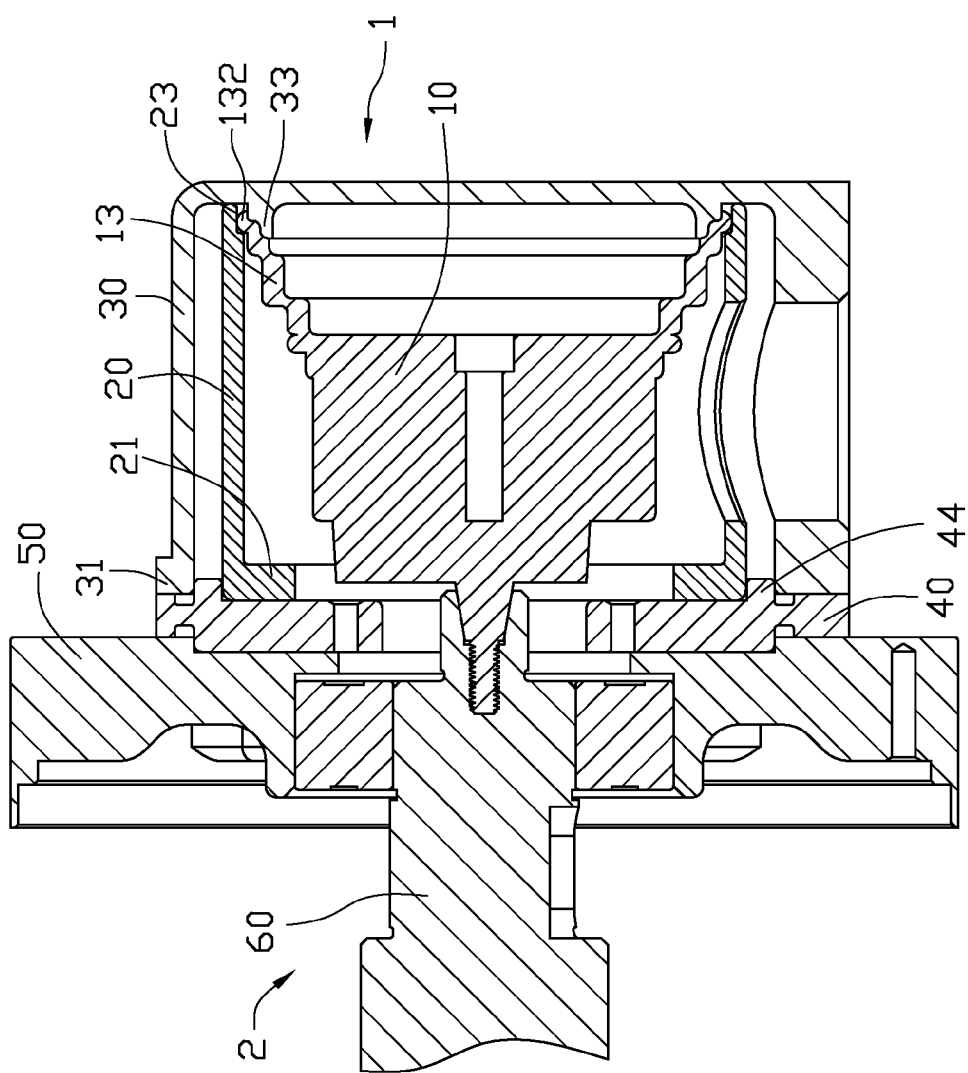
FIG. 3 is a partially cross-sectional view taken along the line III-III of FIG. 2.

Referring to FIGS. 2 and 3, in assembly, the encoder 10 is received in the protecting cover 30, with an inner side of the rubber collar 13 engaging with the protrusion 33 of the closed end 36 of the protecting cover 30. The fixing cover 20 is inserted into the protecting cover 30, with the encoder 10 received in the fixing cover 20. The second open end 25 of the fixing cover 20 engages with the inner wall of the closed end 36 of the protecting cover 30, and the recess 23 of the second open end 25 engages with an outer side of the flange 132 of the rubber collar 13. Thereby, the rubber collar 13 is elastically deformed to be firmly sandwiched between a wall of the recess 23 of the fixing cover 20 and the protrusion 33 of the protecting cover 30. The shaft 112 of the encoder 10 extends out of the first open end 24 of the fixing cover 20. A plurality of screws is provided to pass through the fixing plate 31 of the protecting cover 30 and the fixing portion 21 of the fixing cover 20, to be fixed to the heat insulating plate 40. The shaft 112 of the encoder 10 extends out of the through hole 46 of the heat insulating plate 40. The projection 44 of the heat insulating plate 40 engages in a slot 70 defined between the fixing cover 20 and the protecting cover 30, for further securing the fixing cover 20 and the protecting cover 30. Thereby, the encoder assembly 1 is assembled.

When the encoder assembly 1 is used for a motor 2, including a shaft 60 and a rear cover 50, the shaft 112 of the encoder 10 engages with a portion exposed out of the rear cover 50 of the shaft 60. A plurality of screws is provided to fix the heat insulating plate 40 to the rear cover 50. Thereby, the encoder assembly 1 is mounted to the motor 2. In use, the shaft 112 of the encoder 10 is rotated together with the shaft 60 of the motor 2. The rubber collar 13, elastically deformed to be firmly sandwiched between the recess 23 of the fixing cover 20 and the protrusion 33 of the protecting cover 30, can adequately absorb eccentric vibration of the encoder 10, and prevent the encoder 10 from being damaged.

In this embodiment, the heat insulating plate 40 is fixed between the rear cover 50 of the motor 2 and the fixing cover 20, for reducing heat transference from the motor 2 to the encoder 10. In another embodiment, the heat insulating plate 40 can be omitted.

In this embodiment, each of the flange 132, the recess 23, the protrusion 33, and the projection 44 is ring-shaped, but in other embodiments may be a plurality of spaced elements (i.e. several recesses arranged in a broken ring shape) arranged in a ring shape.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An encoder assembly comprising:
   an encoder comprising a main body, and a trumpet-shaped rubber collar extending from a first end of the main body;
   a fixing cover receiving the encoder therein, the fixing cover comprising a first open end and a second open end opposite to the first open end, the second open end engaging with an outer side of the rubber collar; and
   a protecting cover receiving the fixing cover therein, the protecting cover comprising an open end and a closed end opposite to the open end, a circular protrusion extending from an inner wall of the closed end to engage with an inner side of the rubber collar.

2. The encoder assembly of claim 1, wherein a circular flange protrudes outwardly from the rubber collar, a circular recess is defined in an inner wall of the fixing cover at the second open end, to engage with the flange of the rubber collar.

3. The encoder assembly of claim 1, further comprising a heat insulating plate, wherein the first open end of the fixing cover and the open end of the protecting cover are fixed to the heat insulating plate.

4. The encoder assembly of claim 3, wherein a circular projection extends from the heat insulating plate, to engage in a slot defined between the fixing cover and the protecting cover.

5. The encoder assembly of claim 3, wherein a shaft extends from a second end opposite to the first end of the main body of the encoder, the heat insulating plate defines a through hole, the shaft of the encoder extends through the first open end of the fixing cover, the open end of the protecting cover, and is exposed out of the through hole of the heat insulating plate.

6. The encoder assembly of claim 3, wherein a fixing portion extends from a wall bounding the first open end of the fixing cover towards a center of the first open end, to be fixed to the heat insulating plate; a fixing plate extends outwardly from the protecting cover at the open end, to be fixed to the heat insulating plate.

7. An encoder assembly comprising:
an encoder comprising a main body, a shaft extending from a first end of the main body, and a rubber collar extending from a second end opposite to the first end of the main body;
a fixing cover receiving the encoder therein, the fixing cover comprising a first open end to allow the shaft of the encoder to extend out therethrough, and a second open end opposite to the first open end, wherein the second open end is engaged with an outer side of the rubber collar; and
a protecting cover receiving the fixing cover therein, the protecting cover comprising an open end to allow the shaft of the encoder to extend out therethrough, and a closed end opposite to the open end, wherein a protrusion extends from the protecting cover and at the closed end, to engage with an inner side of the rubber collar.

8. The encoder assembly of claim 7, wherein a flange protrudes outwardly from the rubber collar, a recess is defined in an inner wall of the fixing cover and at the second open end, to engage with the flange of the rubber collar.

9. The encoder assembly of claim 7, further comprising a heat insulating plate, wherein the first open end of the fixing cover and the open end of the protecting cover are fixed to the heat insulating plate.

10. The encoder assembly of claim 9, wherein a projection extends from the heat insulating plate, to engage in a slot defined between the fixing cover and the protecting cover.

11. The encoder assembly of claim 9, wherein the heat insulating plate defines a through hole, the shaft of the encoder extends out of the heat insulating plate through the through hole.

12. The encoder assembly of claim 9, wherein a fixing portion extends inwardly from the fixing cover and at the first open end, to be fixed to the heat insulating plate; a fixing plate extends outwardly from the protecting cover at the open end, to be fixed to the heat insulating plate.

13. An encoder assembly, comprising:
an encoder comprising a main body, and a trumpet-shaped elastic collar extending from the main body;
a cylinder-shaped fixing cover receiving the encoder therein, wherein the fixing cover comprises an open end, the elastic collar extends out of the fixing cover to wrap a first wall bounding the first open end of the fixing cover; and
a cylinder-shaped protecting cover receiving the fixing cover therein, wherein the protecting cover comprises an end;
wherein the elastic collar is sandwiched between the first wall bounding the first open end of the fixing cover and a second wall bounding the end of the protecting cover.

14. The encoder assembly of claim 13, wherein the elastic collar is operable to be deformed, to absorb vibration of the encoder.

* * * * *